United States Patent
Ihsl

(10) Patent No.: US 8,807,932 B2
(45) Date of Patent: Aug. 19, 2014

(54) HYDRAULIC POWER UNIT HAVING CERAMIC OSCILLATOR, AND HYDRAULIC ENGINE INCLUDING THE HYDRAULIC POWER UNIT

(76) Inventor: Lucas Ihsl, Chungcheongnam-do (KR)

(*) Notice: Subject to any disclaimer, the term of this patent is extended or adjusted under 35 U.S.C. 154(b) by 470 days.

(21) Appl. No.: 13/285,245

(22) Filed: Oct. 31, 2011

(65) Prior Publication Data
US 2013/0108428 A1 May 2, 2013

(51) Int. Cl.
*F03B 3/00* (2006.01)

(52) U.S. Cl.
USPC .......................................... 415/202; 417/413.2

(58) Field of Classification Search
CPC ............. F04B 43/0072; F04B 43/0063; F04B 43/046; F03B 3/00; F03B 3/08
USPC ...................... 415/202; 417/413.1, 413.2, 415
See application file for complete search history.

(56) References Cited

U.S. PATENT DOCUMENTS

| | | | | |
|---|---|---|---|---|
| 4,607,627 A | * | 8/1986 | Leber et al. | 601/162 |
| 4,636,149 A | * | 1/1987 | Brown | 417/322 |
| 5,755,553 A | * | 5/1998 | Laemthongsawad | 415/3.1 |
| 6,071,088 A | * | 6/2000 | Bishop et al. | 417/322 |
| 7,121,809 B2 | * | 10/2006 | Takagi et al. | 417/53 |
| 2003/0136122 A1 | | 7/2003 | Barba et al. | |
| 2006/0245947 A1 | | 11/2006 | Seto et al. | |
| 2009/0311116 A1 | | 12/2009 | Bai et al. | |

OTHER PUBLICATIONS

European Search Report: dated Mar. 5, 2012; Appln. No. 11275135.9-2321.

* cited by examiner

*Primary Examiner* — Ninh H Nguyen
(74) *Attorney, Agent, or Firm* — Ladas & Parry LLP

(57) ABSTRACT

This invention discloses a hydraulic power unit, which is capable of strongly jetting a working fluid, may be used to implement a new hydraulic engine. The hydraulic engine generates rotational power by using environmentally friendly electric energy, and has improved performance and a long life span. The hydraulic power unit includes: an inner tube comprising a hollow portion, wherein a fluid inlet and a fluid outlet are formed in the inner tube; a vibration tube comprising a hollow portion, an elastic tube layer and a metal tube layer, and the hollow portion of the vibration tube is connected in line to the hollow portion of the inner tube; an oscillator that is disposed to contact a back end of the vibration tube; an outer check member that is disposed to contact the fluid outlet; and an inner check ring that is disposed to contact the fluid inlet.

15 Claims, 6 Drawing Sheets

HYDRAULIC POWER UNIT HAVING CERAMIC OSCILLATOR, AND HYDRAULIC ENGINE INCLUDING THE HYDRAULIC POWER UNIT

BACKGROUND OF THE INVENTION

1. Field of the Invention

The present invention relates to a hydraulic power unit and a hydraulic engine including the same, and more particularly, to a hydraulic power unit including a ceramic oscillator to receive and jet a fluid using an action of the ceramic oscillator, and a hydraulic engine including the hydraulic power unit to generate a rotational force.

2. Description of the Related Art

Power (rotational force) needed to operate vehicles, appliances, and various other machines is usually obtained by burning fossil fuels. However, combustion of fossil fuels is the main cause of environmental pollution since it generates a large amount of carbon dioxide and other diverse harmful materials. In addition, there is a limited amount of fossil fuels such as crude oil or coal on the earth, and thus it is widely known that there is a limit to dependence on fossil fuels. Thus, in addition to making efforts to find new energy sources, much research is conducted into finding ways to efficiently use existing energy sources.

Achievements of such research so far include a method of generating electric energy by charging batteries as power of vehicles or other machines and a hybrid method of using both combustion of fossil fuels and (energy from) batteries. However, power systems (engines) using electric energy so far have had limited performance. Thus, research on a new power system that does not generate carbon dioxide, that uses environmentally friendly electric energy, that has improved performance, and that has a long life span is demanded greatly.

SUMMARY OF THE INVENTION

The present invention provides an engine for generating rotational power by using environmentally friendly energy, and having improved performance and a long life span.

The present invention also provides an environmentally friendly hydraulic power unit that is capable of jetting a working fluid to realize a new engine, and has a long life span.

According to an aspect of the present invention, there is provided a hydraulic power unit comprising:

an inner tube comprising a hollow portion, wherein a fluid inlet through which a fluid flows in and a fluid outlet through which a fluid is discharged are formed on a surface of the inner tube, and a front end portion of the inner tube is closed;

a vibration tube comprising a hollow portion, an elastic tube layer formed of a flexible material, and a metal tube layer contacting the elastic tuber layer and formed of a metal having elasticity, wherein a plurality of slits extended in a length direction of the vibration tube are formed in the metal tube layer along a circumference of the metal tube layer, and the hollow portion of the vibration tube is connected to the hollow portion of the inner tube to form a hydraulic chamber, and a back portion of the vibration tube is closed;

a back end protrusion disposed to contact a back end of the vibration tube, wherein the back end protrusion is disposed so that the back end of the vibration tube maintains a form that protrudes into the hydraulic chamber;

an oscillator that is fixed to the back end protrusion and is disposed such that the back end protrusion is deformed in inward and outward directions of the hydraulic chamber so as to increase or decrease a pressure of a fluid in the hollow portion formed by the inner tube;

an outer check member that is formed of an elastic material and is disposed to be adhered to a V-shaped groove of the fluid outlet formed in an outer wall of the inner tube; and an inner check ring that is formed of an elastic material and is disposed to be adhered to a V-shaped groove of the fluid inlet formed in an inner wall of the inner tube so as to close the fluid inlet of the inner tube 380 inside the hollow portion of the inner tube.

The oscillator is deformed when electricity is applied to the oscillator due to an inverse piezoelectric effect, wherein the oscillator is deformed in a direction into the hollow portion of the inner tube and a direction opposite thereto.

A plurality of the fluid inlets are formed along a circumference of the inner tube, and the inner check ring is disposed to contact the V-shaped groove of all of the fluid inlets so as to close all of the plurality of fluid inlets by using one inner check ring.

A plurality of the fluid outlets are formed along a circumference of the inner tube, and the outer check member is disposed to contact the V-shaped groove of all the fluid outlets so as to close all of the plurality of fluid outlets by using one outer check member.

The outer check member has a circular shape or an oval shape so as to be adhered between the fluid outlet and an outer housing.

A front end accumulator is disposed at a closed front end of the inner tube, and the front end accumulator comprises an accumulation plate, a front end cap, and a spring, and the spring is disposed between the front end cap and the accumulation plate so as to apply a force that pushes the accumulation plate toward an inner side of the hydraulic chamber with respect to the front end cap.

The hydraulic power unit further comprises a direction conversion tube that is coupled to the inner tube around the inner tube so as to be rotatable around a central axis of the inner tube, wherein the direction conversion tube comprises:

one fluid discharging opening portion that connects to the fluid outlet of the inner tube in order for a fluid to be discharged outside; and two fluid inlet opening portions that connects to the fluid inlet of the inner tube in order for a fluid to flow into the hydraulic chamber, wherein the two fluid inlet opening portions are separated from the fluid outlet opening portion in a circumferential direction by 45 degrees.

According to another aspect of the present invention, there is provided a hydraulic engine comprising: a housing;

a rotor that is rotatably supported inside the housing, wherein a plurality of rotor blades are arranged on a circumference of the rotor;

a plurality of hydraulic power units spaced apart from one another along the circumference of the rotor; and an output axis that rotates according to rotation of the rotor and protrudes out of the housing, wherein the hydraulic power units each comprise:

an inner tube comprising a hollow portion, wherein a fluid inlet through which a fluid flows in and a fluid outlet through which a fluid is discharged are formed in a surface of the inner tube, and a front end portion of the inner tube is closed;

a vibration tube comprising a hollow portion, an elastic tube layer formed of a flexible material, and a metal tube layer contacting the elastic tuber layer and formed of a metal having elasticity, wherein a plurality of slits extended in a length direction of the vibration tube are formed in the metal tube layer along a circumference of the metal tube layer, and the hollow portion of the vibration tube is connected to the hollow portion of the inner tube to form a hydraulic chamber, and a back portion of the vibration tube is closed;

a back end protrusion disposed to contact a back end of the vibration tube, wherein the back end protrusion is disposed so that the back end of the vibration tube maintains a form that protrudes into the hydraulic chamber;

an oscillator that is fixed to the back end protrusion and is disposed such that the back end protrusion is deformed in inward and outward directions of the hydraulic chamber so as to increase or decrease a pressure of a fluid in the hollow portion formed by the inner tube;

an outer check member that is formed of an elastic material and is disposed to be adhered to a V-shaped groove of the fluid outlet formed in an outer wall of the inner tube; and an inner check ring that is formed of an elastic material and is disposed to be adhered to a V-shaped groove the fluid inlet formed in an inner wall so as to close the fluid inlet of the inner tube 380 inside the hollow portion of the inner tube, wherein a pressurized fluid is discharged through the fluid outlet of the inner tube to the rotor blades to generate a rotational force of the output axis.

The oscillator is deformed when electricity is applied to the oscillator due to an inverse piezoelectric effect, wherein the oscillator is deformed into the hollow portion of the inner tube and in a direction opposite thereto.

A plurality of the fluid inlets are formed along a circumference of the inner tube, and the inner check ring is disposed to contact the V-shaped groove of all of the fluid inlets so as to close all of the plurality of fluid inlets by using one inner check ring.

A plurality of the fluid outlets are formed along a circumference of the inner tube, and the outer check member is disposed to contact the V-shaped groove of all the fluid outlets so as to close all of the plurality of fluid outlets by using one outer check member.

The outer check member has a circular shape or an oval shape so as to be adhered between the fluid outlet and an outer housing.

A front end accumulator is disposed at a closed front end of the inner tube, and the front end accumulator comprises an accumulation plate, a front end cap, and a spring, and the spring is disposed between the front end cap and the accumulation plate so as to apply a force that pushes the accumulation plate toward an inner side of the hydraulic chamber with respect to the front end cap.

The hydraulic engine further comprises a direction conversion tube that is coupled to the inner tube around the inner tube so as to be rotatable around a central axis of the inner tube, wherein the direction conversion tube comprises:

one fluid discharging opening portion that connects to the fluid outlet of the inner tube in order for a fluid to be discharged outside; and two fluid inlet opening portions that connects in line to the fluid inlet of the inner tube in order for a fluid to flow into the hydraulic chamber, wherein the two fluid inlet opening portions are each separated from the fluid outlet opening portion in a circumferential direction by 45 degrees.

The hydraulic engine further comprises a driving module for providing driving power of the oscillator of the hydraulic power units, wherein an even number of the hydraulic power units are used, and the driving module applies a signal to one of the plurality of hydraulic power units such that the oscillator reduces a volume of the hydraulic chamber so that a fluid is jetted from the corresponding hydraulic power unit; applies a signal to another hydraulic power unit such that the oscillator is deformed to expand the volume of the hydraulic chamber so as to reduce an internal pressure of the hydraulic chamber and a fluid jetted from an adjacent hydraulic power unit is pressurized into the hydraulic chamber; increases or decreases an amount of a driving fluid by using a difference in supply time of driving frequencies; and drives a direction conversion axis to be positioned at a forward rotation position or a reverse rotation position to control a rotational direction.

In the hydraulic engine according to the embodiments of the present invention, an inverse piezoelectric effect is mainly used in a ceramic oscillator included in a hydraulic power unit that constitutes the hydraulic engine. According to the inverse piezoelectric effect, displacement and a large force are generated in the ceramic oscillator according to a driving voltage, a driving frequency, and rigidity of the ceramic oscillator, and a working fluid is jetted by intensely pressurizing the working fluid to rotor blades by using the displacement and the large force, and thus a torque for rotating a rotor may be increased greatly. In particular, a flow amount (of the working fluid) may be modified as desired by adjusting a supply time period of a driving signal applied to the ceramic oscillator.

Meanwhile, the hydraulic engine according to the embodiments of the present invention is designed not to require, besides power of a secondary battery included in a driving module used in generating a signal to be applied to the ceramic oscillator included in the hydraulic power unit of the driving module, any additional power or fuel. Accordingly, without having to supply additional power or fuel, the hydraulic engine may be continuously operated by using the ceramic oscillator and the secondary battery, which supplies power needed to apply a driving signal to the ceramic oscillator, according to a life span of the ceramic oscillator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

As used herein, expressions such as "at least one of," when preceding a list of elements, modify the entire list of elements and do not modify the individual elements of the list.

Hereinafter, preferred embodiments of the present invention will be described in detail with reference to the attached drawings.

Figure 1:
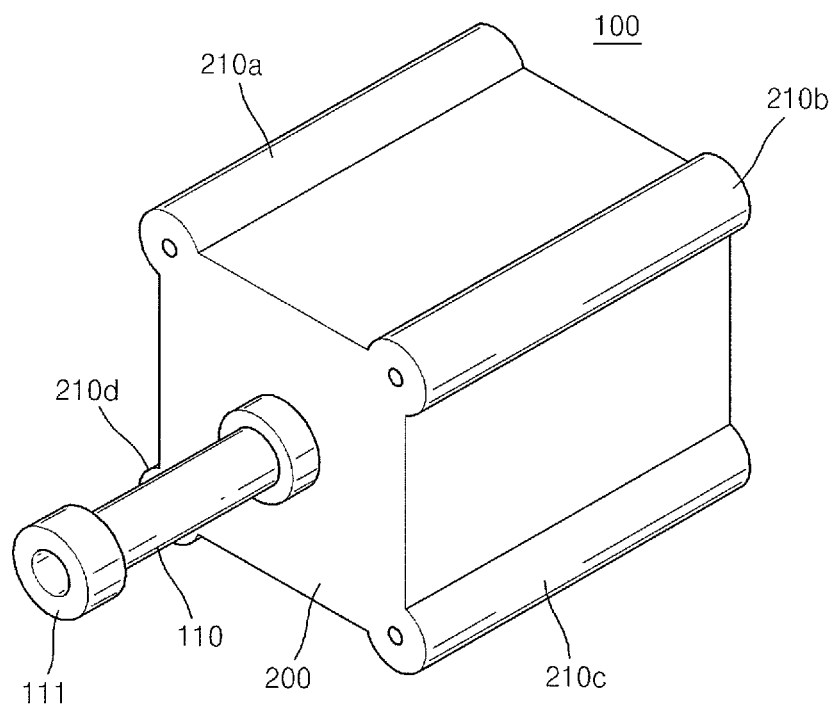
FIG. 1 is a perspective view illustrating an external appearance of a hydraulic engine according to an embodiment of the present invention.
Figure 2:
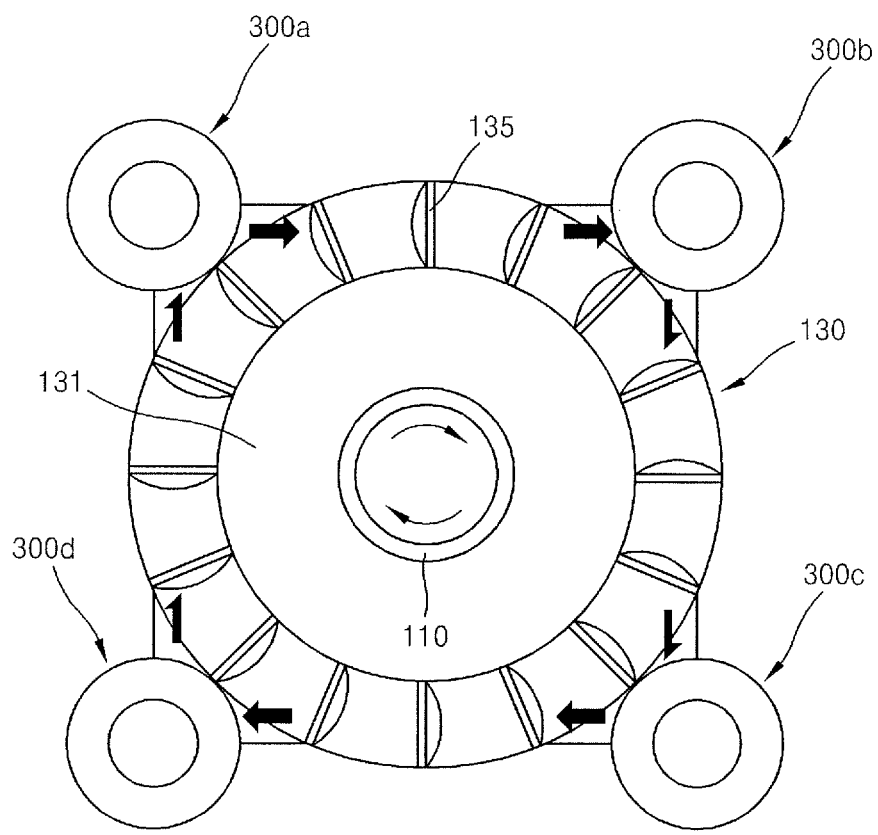
FIG. 2 is a side view illustrating a relationship between a position of a rotor and positions of hydraulic power units arranged inside the hydraulic engine illustrated in FIG. 1, wherein every two hydraulic power units operate as a pair.

FIG. 1 is a perspective view illustrating an external appearance of a hydraulic engine 100 according to an embodiment of the present invention, and FIG. 2 is a side view illustrating a relationship between a position of a rotor 130 and positions of hydraulic power units 300 arranged inside the hydraulic engine 100 illustrated in FIG. 1, wherein every two hydraulic power units 300 operate as a pair. A numeral 300 indicates one or more hydraulic power units, however does not restrict the number of hydraulic power units installed in the hydraulic engine. A numeral 300 itself is not shown in the FIGS.

Referring to FIGS. 1 and 2, the hydraulic engine 100 includes a housing 200, the rotor 130, an output axis 110, and the hydraulic power units 300.

In detail, the housing 200 corresponds to an outer form of the hydraulic engine 100. A plurality of slots 210a, 210b, 210c, and 210d in which the plurality of hydraulic power units 300 are arranged are formed in the housing 200; the slots 210a, 210b, 210c, and 210d are connected to one another via a flow path (not shown) formed in the housing 200.

The rotor 130 is rotatably mounted in the housing 200, and includes a rotor main body 131 and a plurality of rotor blades 135 arranged to protrude in radial directions of the rotor main body 131 with respect to a rotation axis of the rotor main body 131.

The output axis 110 may be a portion that is extended from the rotation axis of the rotor 130 or is formed as a single unit with the rotation axis of the rotor 130, and is installed to protrude from the housing 200.

The hydraulic power units 300 have a function of jetting a fluid toward the plurality of rotor blades 135 arranged in the rotor 130 in tangential directions of the rotor main body 131. The hydraulic power units 300 may be four hydraulic power units 300a, 300b, 300c, and 300d. The four hydraulic power units 300a, 300b, 300c, and 300d may be installed around the rotor 130 as illustrated in FIG. 2. However, the number of hydraulic power units installed in the hydraulic engine is not limited thereto, and as long as every two hydraulic power units are arranged to operate as a pair, the number of hydraulic power units according to embodiments of the present invention is not limited.

In the hydraulic engine 100 illustrated in FIG. 1 including the four hydraulic power units arranged around the rotor 130, every two hydraulic power units operate as a pair so as to shape a fluid flow. In particular, an operation of rotating the rotor 130 via the four hydraulic power units 300 arranged in the hydraulic engine 100 is conducted in two stages. A first stage is denoted by thick arrows in FIG. 2, and a second stage is denoted by thin arrows in FIG. 2.

As illustrated in FIG. 2, in the first stage, among the two hydraulic power units 300a and 300b arranged on the top, the hydraulic power unit 300a disposed on the left jets a fluid, and the hydraulic power unit 300b on the right induces the fluid into the hydraulic power unit 300b by pressurizing the same. At the same time, among the two power units 300c and 300d arranged on the bottom, the hydraulic power unit 300c arranged on the right jets a fluid, and the hydraulic power unit 300d arranged on the left induces the fluid into the hydraulic power unit 300d by pressurizing the same.

As illustrated in FIG. 2, in the second stage, among the two hydraulic power units 300a and 300d arranged on the left, the hydraulic power unit 300d on the bottom jets a fluid, and the hydraulic power unit 300a on the top induces the fluid into the hydraulic power unit 300a by pressurizing the same. At the same time, among the two power units 300b and 300c arranged on the right, the hydraulic power unit 300b arranged on the top jets a fluid, and the hydraulic power unit 300c arranged on the bottom induces the fluid into the hydraulic power unit 300c by pressurizing the same.

As the first stage ends, the second stage is performed, and the stages are repeated sequentially, thereby rotating the rotor 130.

The hydraulic engine 100 according to the current embodiment of the present invention may be used by connecting the output axis 110 of the hydraulic engine 100 by using power transferring elements such as a pulley 111, a belt, a gear, etc. in vehicles or other machines that require a rotational force.

As illustrated in FIG. 2, if a surface of a cross-section of a rotor blade facing a fluid proceeding direction is formed to be convex in a space filled with the fluid, a surface area of the rotor blade contacting the fluid is increased, and thus the rotor blade is able to receive a greater force.

Figure 3:
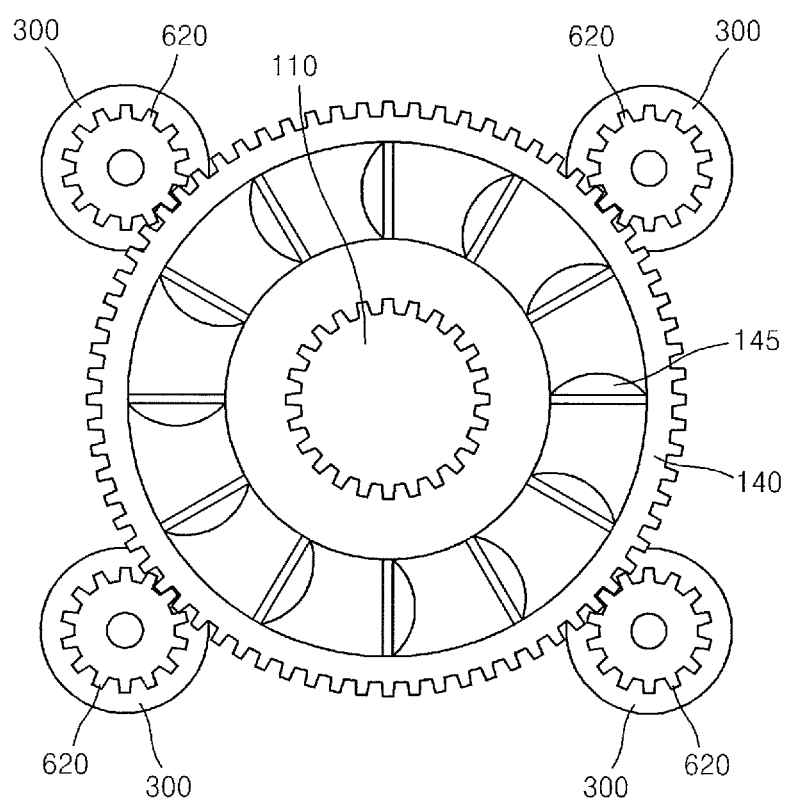
FIG. 3 is a schematic view illustrating a rotor of which a rotation direction is changeable by simultaneously changing directions of hydraulic power units.

FIG. 3 is a schematic view illustrating a hydraulic engine having a rotor which has a rotation direction that is changeable by simultaneously changing directions of hydraulic power units.

As illustrated in FIG. 3, when a gear 140 independently controlled to rotate without regard to the rotation of the rotor 130 and teeth engaged with gears 620 respectively arranged at front ends of the hydraulic power units 300 rotates one of the gears 620, the other gears 620 may also rotate. Accordingly, a direction of a fluid jet from the hydraulic power units 300 may be changed, and the rotational direction of the rotor 130 may be changed by adjusting the direction of the fluid jet. A rotational angle of the hydraulic power units 300 may be 90 degrees; however, the rotational angle according to the present embodiment of the present invention is 45 degrees. A configuration thereof will be described in detail by describing a configuration of a direction conversion tube 330 below.

Figure 4:
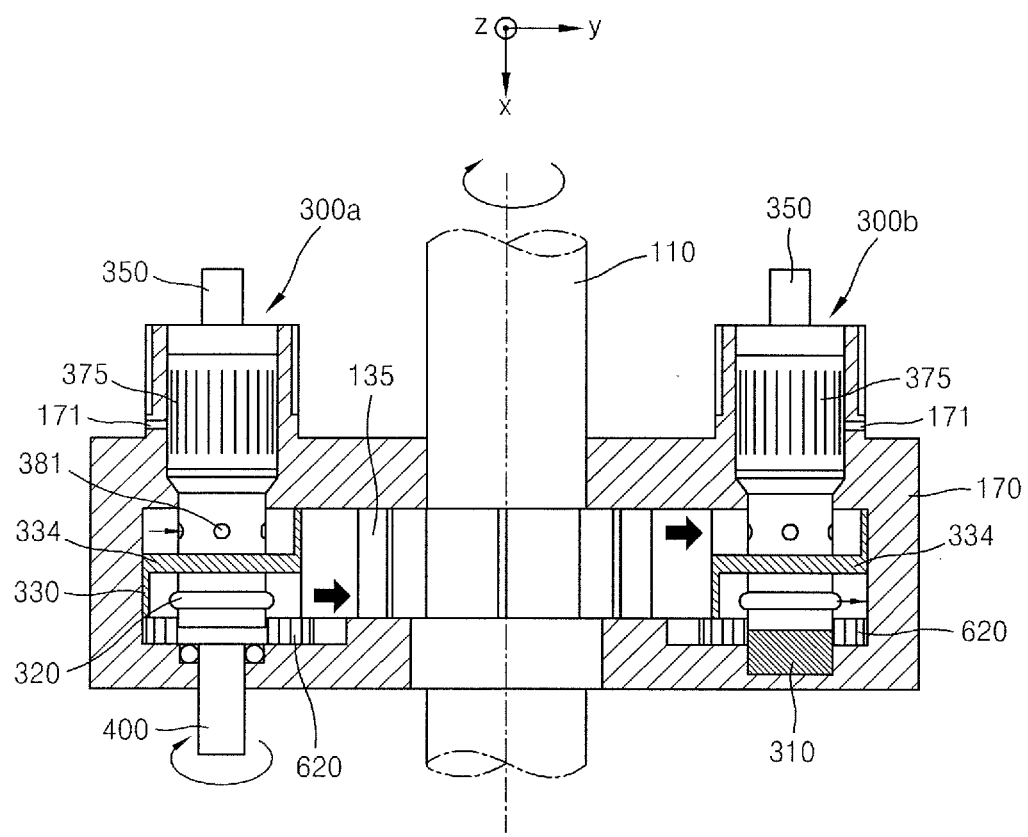
FIG. 4 is a partial cross-sectional view illustrating a relationship between a position of a rotor illustrated in FIG. 1 installed in a housing and positions of two hydraulic power units disposed on two sides of the rotor according to an embodiment of the present invention.

FIG. 4 is a partial cross-sectional view illustrating a relationship between the position of the rotor 130 installed in the housing 170 and the positions of two hydraulic power units 300 disposed on two sides of the rotor 130 illustrated in FIG. 1 according to an embodiment of the present invention.

As illustrated in FIG. 4, the hydraulic power units 300 are arranged on two sides of the rotor 120. The hydraulic power units 300 basically have the same configuration as each other except for a portion of front end portions thereof (lower portions in FIG. 4).

At the front end of the hydraulic power unit 300a, a direction conversion axis connected to the gears 120 and the direction conversion 330 may be arranged. By rotating the direction conversion axis, the direction conversion tube 330 arranged at each of the hydraulic power units 300 may be rotated. Alternatively, it is sufficient when the direction conversion axis is installed at only one of the hydraulic power units 300.

At the front end of the hydraulic power unit 300b, a front end accumulator is installed. The front end accumulator needs not be installed at all hydraulic power units 300 and may be installed only at one of two hydraulic power units 300 that has a function of jetting a fluid when receiving a first driving signal from a driving module, among every two hydraulic power units operating as a pair. The configuration of the front end accumulator will be described in detail with reference to FIG. 5.

Figure 5:
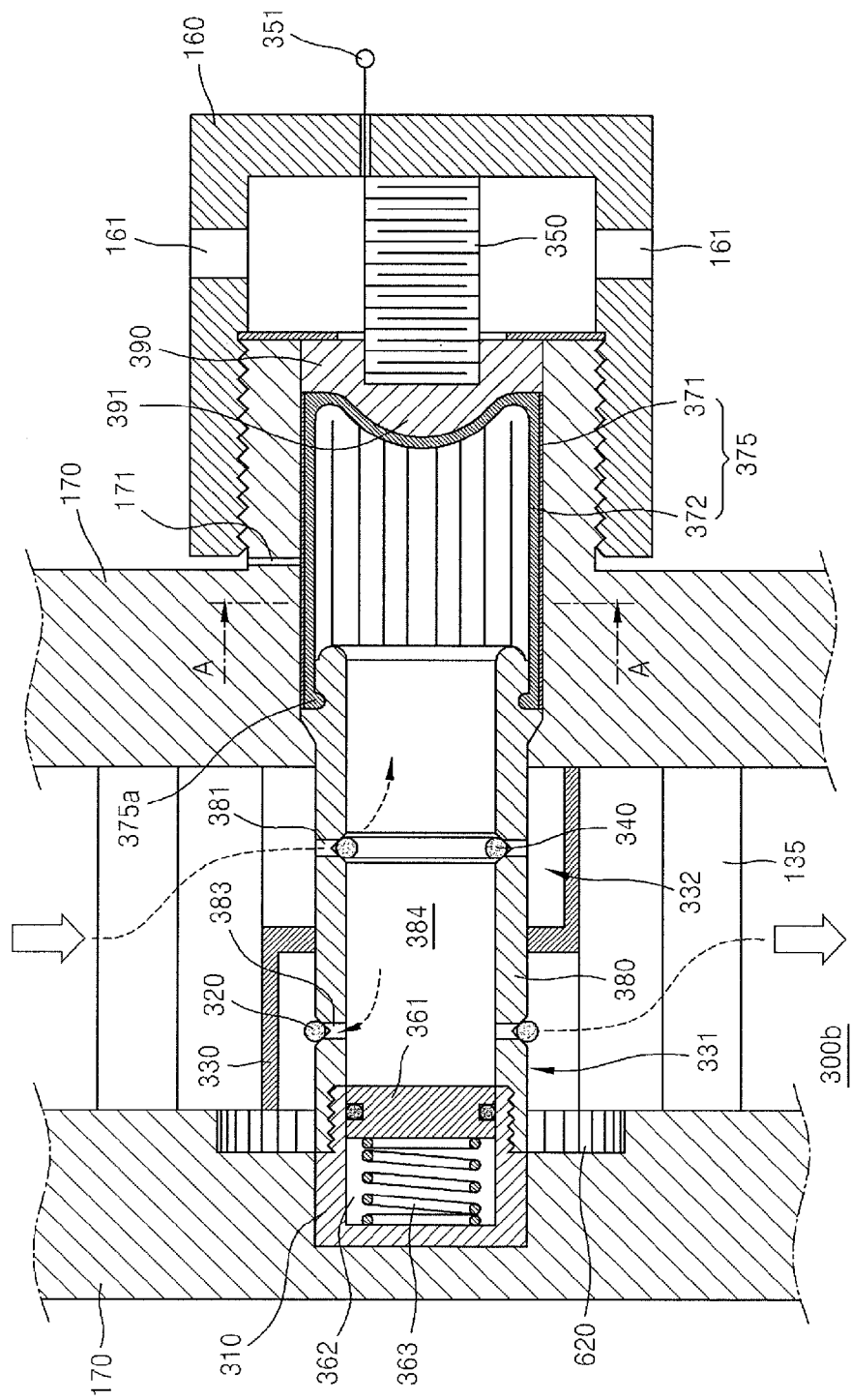
FIG. 5 is a cross-sectional view illustrating a detailed configuration of a hydraulic power unit according to an embodiment of the present invention.

FIG. 5 is a cross-sectional view illustrating a detailed configuration of the hydraulic power unit 300b according to an embodiment of the present invention.

As illustrated in FIG. 5, the hydraulic power unit 300b includes the front end accumulator, an inner tube 380, a vibration tube 375, a back end protrusion 390, an oscillator 350, an inner check ring 340, an outer check ring 320, and the direction conversion tube 330.

The front end accumulator has a function of storing a first inflow into a hydraulic chamber 384 when a fluid first flows into the hydraulic chamber 384; the front end accumulator includes a front end cap 310, a spring 363, and an accumulation plate 361. The front end cap 310 is connected to the inner tube 380, and the accumulation plate 361 blocks a front end side of the inner tube 380. Two ends of the spring 363 are respectively coupled to the front end cap 310 and the accumulation plate 361.

The inner tube 380 contains a working fluid, and with the accumulation plate 361 and the vibration tube 375, forms the hydraulic chamber 384. At least one fluid outlet 383 and at least one fluid inlet 381 are formed in the inner tube 380.

The vibration tube 375 may be deformed to reduce a volume of the hydraulic chamber 384 according to an operation of the oscillator 350; the vibration tube 375 is used to overcome limitations related to the ceramic oscillator's amplitude, and to increase an amount of fluid moving according to motion of the oscillator 350. The vibration tube 375 has a two-layer structure consisting of a metal tube layer 371 and an elastic tube layer 372. Plurality of slits 371a are formed in the metal tube layer 371 along a length direction of the vibration tube 375. The vibration tube 375 will be described in detail below with reference to FIG. 6.

The back end protrusion 390 is disposed at a back end of the vibration tube 375 so that the back end of the vibration tube 375 may maintain a form that protrudes into the hydraulic chamber 384.

The oscillator 350 is fixed to a back end of the back end protrusion 390 and may deform toward the hydraulic chamber 384. The oscillator 350 may be formed of a piezoelectric element, and preferably, may be formed as a stack of a plurality of piezoelectric elements.

The inner check ring 340 is disposed to be mounted in the fluid inlet 381 formed in the inner tube 380 so as to open or close the fluid inlet 381. A V-shaped groove is formed along an inner circumference portion of the inner tube 380 where the fluid inlet 381 is formed, and the inner check ring 340 is mounted in the V-shaped groove.

The outer check ring 320 is disposed to be mounted in the fluid outlet 383 formed in the inner tube 380 so as to open or close the fluid outlet 383. A V-shaped groove is formed along an outer circumference portion of the inner tube 380 where the fluid outlet 383 is formed, and the outer check ring 320 is mounted in the V-shaped groove.

The direction conversion tube 330 is arranged outside the inner tube 380 and adjusts a direction of a jet flowing out from the hydraulic chamber 384 and an inlet direction of a fluid flowing into the hydraulic chamber 384. The direction conversion tube 330 will be described in detail below with reference to FIG. 7.

Hereinafter, the configurations of the vibration tube 375 and the direction conversion tube 330 will be described in detail with reference to FIGS. 6 and 7.

Figure 6:
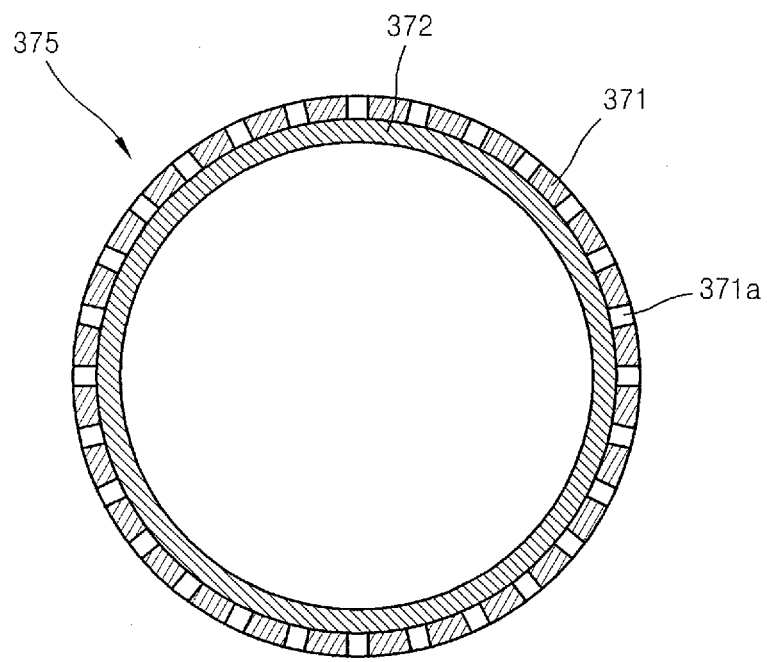
FIG. 6 is a cross-sectional view illustrating a vibration tube cut along a line A-A of FIG. 5, according to an embodiment of the present invention.

FIG. 6 is a cross-sectional view illustrating the vibration tube 375 cut along a line A-A of FIG. 5.

As illustrated in FIG. 6, the vibration tube 375 includes two layers: the elastic tube layer 372, which is easily elastically deformed and restored and which may be formed of a material such as urethane or rubber, as an inner layer, and the metal tube layer 371, which is formed of a metal and comprises the plurality of slits 371a extended in the length direction of the vibration tube 375 and formed along a circumferential direction of the vibration tube 375 and at predetermined intervals, as an outer layer.

The metal tube layer 371 is formed of a material having a greater modulus of elasticity than that of the elastic tube layer 372, but due to the slits 371a, the metal tube layer 371 may be deformed toward the hydraulic chamber 384 or away from the hydraulic chamber 384.

A protrusion 375a is formed at an end portion of the elastic tube layer 372 in the vibration tube 375 toward the inner tube 380, and a groove for accommodating the protrusion 375a is formed in an outer portion of an end portion of the inner tube 380 so that the elastic tube layer 372 is firmly fixed to the inner tube 380.

Figure 7:
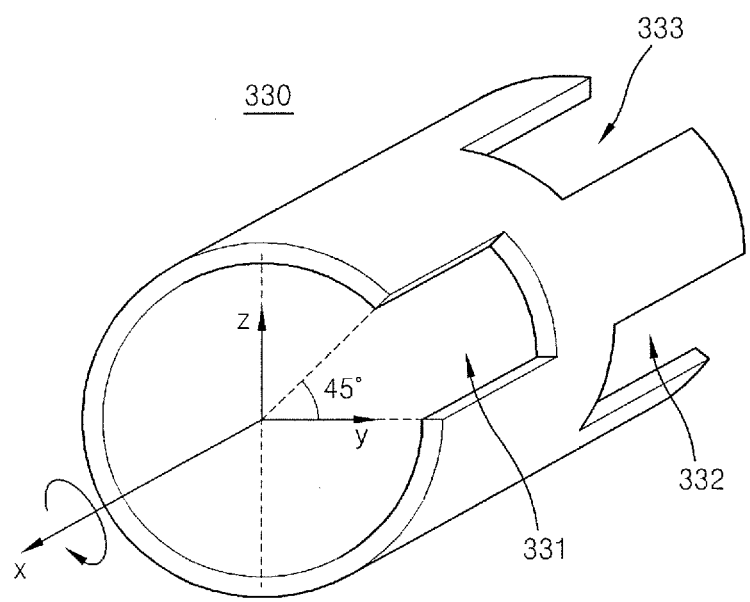
FIG. 7 is a perspective view illustrating a direction converting tube according to an embodiment of the present invention.

FIG. 7 is a perspective view illustrating the direction conversion tube 330 according to an embodiment of the present invention.

As illustrated in FIG. 7, the direction conversion tube 330 has a form of a tube having a circular cross-section, in which three opening portions are formed. One of the opening portions is a fluid discharging opening portion formed at the fluid outlet 383 (front end side), and the two other opening portions are a fluid inlet opening portion and a third inlet opening portion formed at the fluid inlet 381 (back end side). An x-axis of FIG. 7 corresponds to a central axis of the direction conversion tube 330, and along a circumferential direction centered about the x-axis and with respect to a y-axis as a reference line, the fluid discharging opening portion is disposed in a range from 0 to 45 degrees, and the fluid inlet opening portion is disposed in a range from 0 to −45 degrees, and the third inlet opening portion is disposed in a range from 45 to 90 degrees. When the hydraulic power unit 300a jets a fluid toward the hydraulic power unit 300b as denoted by a thick arrow in FIG. 2, the direction conversion tube 330 maintains a state as illustrated in FIG. 7. To change a rotational direction of the output axis 110 of the hydraulic engine 100, the direction conversion tube 330 is rotated by 45 degrees clockwise with respect to the x-axis, and here, a fluid may be jetted downward through the fluid discharging opening portion, or a fluid may flow from a side direction through the third inlet opening portion.

Meanwhile, the outer check ring 320 is formed of an elastic material and has a function of opening or closing the fluid outlet 383. Instead of a ring form, a ball form may perform the same function. For example, a ball sheet may be formed on the fluid outlet 383, and a check ball may be mounted on the ball sheet, and then an outer housing may be installed such that the check ball is adhered to the fluid outlet 383. In this case, the check ball is maintained in a state of being pressed slightly between the fluid outlet 383 and the outer housing, and when an internal pressure of the hydraulic chamber 384 increases, the check ball deforms, thereby opening the fluid outlet 383. Obviously, when the internal pressure of the hydraulic chamber 384 is reduced, the check ball is adhered to the fluid outlet 383, thereby closing the fluid outlet 383.

Hereinafter, an operation of the hydraulic power units 300 used in the hydraulic engine 100 according to an embodiment of the present invention will be described.

First, as the oscillator 350 is deformed toward the inner tube 380, that is, in a direction in which the volume of the hydraulic chamber 384 is reduced, a portion of the vibration tube 375 contacting a housing 170 contracts toward an inner portion of the vibration tube 375, and the internal pressure of the hydraulic chamber 384 increases. Accordingly, the fluid inlet 381 is closed by the inner check ring 340, and the outer check ring 320 is deformed, thereby jetting a working fluid through the fluid outlet 383. Also, the fluid passed through the fluid outlet 383 is discharged from the fluid outlet 331 of the direction conversion tube 330 toward the rotor blades 135.

On the other hand, when the oscillator 350 is deformed away from the inner tube 380, that is, in a direction in which the volume of the hydraulic chamber 384 is returned to its original state, the vibration tube 375 returns to its original position, and the pressure of the hydraulic chamber 384 decreases. Consequently, the fluid inlet 384 is opened, and a working fluid is pressurized into the hydraulic chamber 384, as the vibration tube 375 returns to its original position.

Meanwhile, the front end accumulator that uniformly balances small differences between an outlet amount and an inlet amount of a driving fluid is disposed between a pair of the hydraulic power units 300 at the front end portion of one hydraulic power unit.

The accumulator facilitates quick movement of a stationary fluid in the closed housing 170 as a machine starts driving. That is, when the oscillator 350 first starts to form a pressurized state so that the machine may start driving, the spring 363 of the accumulator is compressed, thereby enabling a quick start, and a fluid flow generated due to the movement of the oscillator 350 flows to and is accumulated at the front end portion of the hydraulic power unit. After all the oscillators 350 are in a stationary state, the accumulated fluid flows out and the spring 363 returns to its original state to facilitate restarting of the machine.

Meanwhile, in order to perform the above-described operation, a driving module for controlling a driving signal applied to the oscillator 350 of the hydraulic power units 300 may be further used in addition to the hydraulic power units 300.

A configuration of a hydraulic engine with a driving module for controlling hydraulic power units will be summarized as follows.

The driving module basically applies a driving signal simultaneously to two hydraulic power units.

As a first driving signal is applied from the driving module, the oscillator 350 arranged in a hydraulic power unit (for example, 300a) is deformed in a direction to increase the pressure inside the hydraulic chamber 384 (forward direction), and a force acts upon a fluid inside the hydraulic chamber 384 due to the deformation of the vibration tube 375. The force acting upon the fluid is relatively large due to the characteristics of the oscillator 350, and this large force is transferred to the fluid inside the hydraulic chamber 384. Due to this force, the inner check ring 340 is adhered to the V-shaped groove in which the inner check ring 340 is mounted, thereby maintaining the fluid inlet 381 in a blocked state; as the outer check ring 320 having a smaller rigidity than a wall surface of the hydraulic chamber 384 is deformed, the fluid is pushed out of the hydraulic chamber 384 of the hydraulic power unit 300a through the fluid outlet 383.

The first driving signal of the driving module is also applied to the oscillator 350 of a neighboring hydraulic driving unit (for example, 300b); as the signal is applied, the oscillator 350 and the vibration tube 375 are deformed such that the pressure in the hydraulic chamber 384 is reduced (backward direction). When the pressure in the hydraulic chamber 384 is reduced, the outer check ring 320 is maintained in a state being adhered to the fluid outlet 383, and the inner check ring 340 does not seal the fluid inlet 381 and thus a fluid may be pressurized into the hydraulic chamber 384 of the hydraulic driving unit 300b via the fluid inlet 381 at which the inner check ring 340 is disposed.

When all of hydraulic power units and elements connected to inner and outer portions thereof are filled with a fluid and sealed, the fluid inside the sealed space may be circulated in a desired direction to thereby prevent cavitations in the fluid.

In order to increase an amount of a fluid being discharged through an outlet, a variation amount of the oscillator 350, that is, a stroke, needs to be increased. The stroke may be increased by increasing a voltage to be applied, or instrumentally, by forming a stack of a plurality of piezoelectric elements used as the oscillator 350.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hydraulic power unit comprising:
an inner tube comprising a hollow portion, wherein a fluid inlet through which a fluid flows in and a fluid outlet through which a fluid is discharged are formed on a surface of the inner tube, and a front end portion of the inner tube is closed;
a vibration tube comprising a hollow portion, an elastic tube layer formed of a flexible material, and a metal tube layer contacting the elastic tuber layer and formed of a metal having elasticity,
wherein a plurality of slits extended in a length direction of the vibration tube are formed in the metal tube layer along a circumference of the metal tube layer, and the hollow portion of the vibration tube is connected to the hollow portion of the inner tube to form a hydraulic chamber, and a back portion of the vibration tube is closed;
a back end protrusion disposed to contact a back end of the vibration tube, wherein the back end protrusion is disposed so that the back end of the vibration tube maintains a form that protrudes into the hydraulic chamber;
an oscillator that is fixed to the back end protrusion and is disposed such that the back end protrusion is deformed in inward and outward directions of the hydraulic chamber so as to increase or decrease a pressure of a fluid in the hollow portion formed by the inner tube;
an outer check member that is formed of an elastic material and is disposed to be adhered to a V-shaped groove of the fluid outlet formed in an outer wall of the inner tube; and
an inner check ring that is formed of an elastic material and is disposed to be adhered to a V-shaped groove of the fluid inlet formed in an inner wall of the inner tube so as to close the fluid inlet of the inner tube 380 inside the hollow portion of the inner tube.

2. The hydraulic power unit of claim 1, wherein the oscillator is deformed when electricity is applied to the oscillator due to an inverse piezoelectric effect, wherein the oscillator is deformed in a direction into the hollow portion of the inner tube and a direction opposite thereto.

3. The hydraulic power unit of claim 1, wherein a plurality of the fluid inlets are formed along a circumference of the inner tube, and the inner check ring is disposed to contact the V-shaped groove of all of the fluid inlets so as to close all of the plurality of fluid inlets by using one inner check ring.

4. The hydraulic power unit of claim 1, wherein a plurality of the fluid outlets are formed along a circumference of the inner tube, and the outer check member is disposed to contact the V-shaped groove of all the fluid outlets so as to close all of the plurality of fluid outlets by using one outer check member.

5. The hydraulic power unit of claim 1, wherein the outer check member has a circular shape or an oval shape so as to be adhered between the fluid outlet and an outer housing.

6. The hydraulic power unit of claim 1, wherein a front end accumulator is disposed at a closed front end of the inner tube, and
the front end accumulator comprises an accumulation plate, a front end cap, and a spring, and
the spring is disposed between the front end cap and the accumulation plate so as to apply a force that pushes the accumulation plate toward an inner side of the hydraulic chamber with respect to the front end cap.

7. The hydraulic power unit of claim 1, further comprising a direction conversion tube that is coupled to the inner tube around the inner tube so as to be rotatable around a central axis of the inner tube,
wherein the direction conversion tube comprises:
one fluid discharging opening portion that connects to the fluid outlet of the inner tube in order for a fluid to be discharged outside; and
two fluid inlet opening portions that connects to the fluid inlet of the inner tube in order for a fluid to flow into the hydraulic chamber,
wherein the two fluid inlet opening portions are separated from the fluid outlet opening portion in a circumferential direction by 45 degrees.

8. A hydraulic engine comprising:
a housing;
a rotor that is rotatably supported inside the housing, wherein a plurality of rotor blades are arranged on a circumference of the rotor;
a plurality of hydraulic power units spaced apart from one another along the circumference of the rotor; and
an output axis that rotates according to rotation of the rotor and protrudes out of the housing,
wherein the hydraulic power units each comprise:
an inner tube comprising a hollow portion, wherein a fluid inlet through which a fluid flows in and a fluid outlet through which a fluid is discharged are formed in a surface of the inner tube, and a front end portion of the inner tube is closed;
a vibration tube comprising a hollow portion, an elastic tube layer formed of a flexible material, and a metal tube layer contacting the elastic tuber layer and formed of a metal having elasticity,
wherein a plurality of slits extended in a length direction of the vibration tube are formed in the metal tube layer along a circumference of the metal tube layer, and the hollow portion of the vibration tube is connected to the hollow portion of the inner tube to form a hydraulic chamber, and a back portion of the vibration tube is closed;
a back end protrusion disposed to contact a back end of the vibration tube, wherein the back end protrusion is disposed so that the back end of the vibration tube maintains a form that protrudes into the hydraulic chamber;
an oscillator that is fixed to the back end protrusion and is disposed such that the back end protrusion is deformed in inward and outward directions of the hydraulic chamber so as to increase or decrease a pressure of a fluid in the hollow portion formed by the inner tube;
an outer check member that is formed of an elastic material and is disposed to be adhered to a V-shaped groove of the fluid outlet formed in an outer wall of the inner tube; and
an inner check ring that is formed of an elastic material and is disposed to be adhered to a V-shaped groove the fluid inlet formed in an inner wall so as to close the fluid inlet of the inner tube 380 inside the hollow portion of the inner tube,
wherein a pressurized fluid is discharged through the fluid outlet of the inner tube to the rotor blades to generate a rotational force of the output axis.

9. The hydraulic engine of claim 8, wherein the oscillator is deformed when electricity is applied to the oscillator due to an inverse piezoelectric effect, wherein the oscillator is deformed into the hollow portion of the inner tube and in a direction opposite thereto.

10. The hydraulic engine of claim 8, wherein a plurality of the fluid inlets are formed along a circumference of the inner tube, and the inner check ring is disposed to contact the V-shaped groove of all of the fluid inlets so as to close all of the plurality of fluid inlets by using one inner check ring.

11. The hydraulic engine of claim 8, wherein a plurality of the fluid outlets are formed along a circumference of the inner tube, and the outer check member is disposed to contact the V-shaped groove of all the fluid outlets so as to close all of the plurality of fluid outlets by using one outer check member.

12. The hydraulic engine of claim 8, wherein the outer check member has a circular shape or an oval shape so as to be adhered between the fluid outlet and an outer housing.

13. The hydraulic engine of claim 8, wherein a front end accumulator is disposed at a closed front end of the inner tube, and
the front end accumulator comprises an accumulation plate, a front end cap, and a spring, and
the spring is disposed between the front end cap and the accumulation plate so as to apply a force that pushes the accumulation plate toward an inner side of the hydraulic chamber with respect to the front end cap.

14. The hydraulic engine of claim 8, further comprising a direction conversion tube that is coupled to the inner tube around the inner tube so as to be rotatable around a central axis of the inner tube,
wherein the direction conversion tube comprises:
one fluid discharging opening portion that connects to the fluid outlet of the inner tube in order for a fluid to be discharged outside; and
two fluid inlet opening portions that connects in line to the fluid inlet of the inner tube in order for a fluid to flow into the hydraulic chamber,
wherein the two fluid inlet opening portions are each separated from the fluid outlet opening portion in a circumferential direction by 45 degrees.

15. The hydraulic engine of claim 8, further comprising a driving module for providing driving power of the oscillator of the hydraulic power units,
wherein an even number of the hydraulic power units are used, and the driving module applies a signal to one of the plurality of hydraulic power units such that the oscillator reduces a volume of the hydraulic chamber so that a fluid is jetted from the corresponding hydraulic power unit; applies a signal to another hydraulic power unit such that the oscillator is deformed to expand the volume of the hydraulic chamber so as to reduce an internal pressure of the hydraulic chamber and a fluid jetted from an adjacent hydraulic power unit is pressurized into the hydraulic chamber; increases or decreases an amount of a driving fluid by using a difference in supply time of driving frequencies; and drives a direction conversion axis to be positioned at a forward rotation position or a reverse rotation position to control a rotational direction.

* * * * *